United States Patent Office 3,373,041
Patented Mar. 12, 1968

3,373,041
METHOD OF PREPARING BREWED COFFEE
Jack Bloom and Leroy W. Brown, Chicago, Ill., assignors to Continental Coffee Company, a corporation of Illinois
No Drawing. Filed Jan. 23, 1964, Ser. No. 339,596
6 Claims. (Cl. 99—68)

This invention relates to beverages. More particularly, it relates to coffee prepared as a brew of roasted and comminuted coffee beans. Still more particularly, it relates to dry, ground coffee bean compositions adapted for brewing with softened water.

In accordance with the present invention a comminuted coffee bean composition is prepared, the flavor of whose brew is similar irrespective of brewing with hard water or with softened water. In preparing the coffee bean composition, the coffee beans are subjected to special degrees of roasting and ground to a critical particle size distribution pattern. An organic food grade acid is incorporated with the bean material in quantities to produce in a brew thereof a pH in the range between about 4.8 and 5.4.

Conventional, drip, regular, etc. grinds of coffee beans when brewed with untreated water, i.e., tap water of acidity in the range of pH 6.0 to 8.0, produce a brew having a pleasing aroma, pleasant taste and a medium brown color.

It is known and generally accepted in the trade that when the conventional, drip, regular, etc. grinds of coffee beans are brewed with softened water, such softening usually being the result of substitution of sodium ions for the calcium ions normally present, the coffee beverage has poor quality in terms of flavor and appearance. The poor quality is attributable to changes in the coffee grounds whereby they produce a filter blend of slower filtration action, to reaction with the tannin-like and/or partially decomposed carbohydrate materials in the coffee beans productive of a very dark coloring matter in the coffee solution and to alteration effects upon the naturally occurring flavoring components of the coffee beans. The effects resulting from the use of softened water are so apparent that the average coffee drinker recognizes the differences simply from visual observation and testing the vapor for aroma.

Now it has been discovered that a ground coffee bean product can be prepared which will meet the commonly accepted standard for brews even though prepared with softened water. This dry, ground coffee bean composition is prepared by roasting coffee beans, preferably a blend of African, Central American, South American, etc., coffees to a temperature in the range between about 375° F. and about 425° F., preferably between about 390° F. and about 410° F., until a brew thereof prepared according to a brew test and measured by a spectrophotometer at 550 millimicron wave length shows an optical density in the range between about 0.35 and 0.45, and irrespective of the order of the following steps, grinding the beans to produce a comminuted coffee of a relatively uniform particle size such that preferably 95% thereof will pass through a No. 16 U.S. Standard Screen, and less than about 10% will be fines capable of passage through a No. 100 Standard Screen, and incorporating an edible or food grade organic acid in amounts between 0.1% and 0.5% by weight of the dry, comminuted coffee beans.

Coffee beans useful for the purposes of this invention fall into the broad categories of Brazils, Central American, Colombian, East African Arabica and African Robusta coffees.

Green coffee beans either of a single variety or a blended mixture are roasted in conventional roasters at temperatures in the range between about 375° F. and 425° F. The termination point for roasting is determined by periodically withdrawing samples for a brew test which involves grinding the roasted bean to a particle size such that all material passes a No. 30 screen, adding two grams of this ground coffee to 100 cc. of boiling distilled water and continuing the boiling for exactly five minutes, transferring the resultant suspension of coffee and water to a 100 ml. volumetric flask, cooling the decoction to 68° F., and adding distilled water to make the volume up to the 100 ml. mark. The cooled suspension is filtered through filter paper using a filter aid. The clear filtrate is placed in a 10 mm. cuvette and the optical density of the solution is read at 550 millimicron wave length in a spectrophotometer, such as Coleman 6A spectrophotometer. When optical density of the clear filtrate is in the range between about 0.35 and 0.45 and preferably between about 0.38 and 0.42, the roasting is terminated and the roasted beans are cooled in accordance with conventional coffee bean handling procedure.

Coffee beans roasted to the above explained degree, if they are to exhibit a brewing time such that the presence of bitterness and off-flavors in the brews are to be avoided, must be comminuted to a critical size range.

A brew time is determined by placing 85 grams of ground coffee in the bottom of a tapered aluminum cylinder supported on a cloth filter on the bottom, said filter having a diameter of 5 inches. 64 fluid ounces of water at a temperature of 200° F. are poured over the coffee in this cylinder and the time required for 58 fluid ounces of brew to collect is recorded. In such a test, hard water is simulated by dissolving 400 parts per million (p.p.m.) of calcium chloride and 200 parts per million (p.p.m.) of sodium bicarbonate in distilled water. To simulate brewing with softened water, 500 p.p.m. of sodium bicarbonate is dissolved in distilled water.

Generally a brew time of 360 seconds or less is deemed an acceptable period. A brew time is attained for conventional grinds of coffee, for example, a conventional grind consisting of a coffee of a particle size showing 2.3% retained on a No. 16 U.S. Standard Screen, 29.9% on a No. 20 U.S. Standard Screen, 45.1% on a No. 30 U.S. Standard Screen, 22.5% passing a No. 30 U.S. Standard Screen and 12% passing through a 100 mesh screen, of 274 seconds with hard water. The same grind of coffee brewed with soft water will not filter in a period which meets the specification of 360 seconds or less but gives a brew time of 560 seconds, a period which is so long and extended that the brew has bitterness and off flavors.

To attain an acceptable brew time when the coffee brew is to be prepared with softened water, it is necessary that the coffee beans, roasted as above described, be comminuted to particles of reasonably uniform size and fall within a critical range of dimensions. To meet the requirements, it is necessary that about 95% to 100% of a grind pass through a No. 16 U.S. Standard Screen and that less than 10% and preferably less than 6% be fines passing through a No. 100 U.S. Standard Screen.

A material of such uniform particle size may be attained by careful grinding in conventional coffee grinders and, if necessary, by screening to limit the end product to a maximum of 10% of fines.

Roasting conditions and grinding conditions, are not in and of themselves sufficient to insure acceptable flavor and aroma. It is necessary to maintain an acidity in the brews in the pH range between about 4.8 and 5.4. To accomplish this result, an edible organic acid is incorporated into the coffee composition. Suitable acids are citric acid, tartaric acids, malic acid, lactic acid and the like. An acid, for example, citric acid may be mixed in powder form into a ground coffee or incorporated by spraying a solution of the acid onto either the coffee beans or a ground coffee.

A typical solution for spraying coffee beans contains between about one and about two pounds of citric acid per quart of water. Acid, in solid or solution form is incorporated into the coffee bean material in quantities to have 0.1% to 0.5%, preferably between 0.15% and 0.25% of citric acid, based upon the weight of the coffee beans. Tartaric acid in approximately the same amounts will produce approximately the same pH in a softened water brew of a grind of coffee beans.

The invention will be more fully illustrated by the following examples of the method of preparation of a grind of coffee beans and the character of the coffee drink prepared using softened water, which are given by way of illustration and without any intention that the invention be limited thereto.

EXAMPLE I

A commercial blend of green coffee beans is prepared by mixing on a weight basis, 40% of a Santos IV coffee, 40% of a Central American coffee and 20% of Colombian coffee. 500 pounds of the blended green beans are roasted to a temperature of approximately 400° F. in a so-called Thermalo roaster, manufactured by Jabez Burns and Company, until the optical density of a brew of a sample of the roasted beans was 0.4 by the spectrophotometer test.

The roasted beans were cooled to room temperature and the beans sprayed with one quart of solution containing one pound of citric acid so as to incorporate approximately 0.2% by weight of citric acid.

The citric acid impregnated coffee was ground to a particle size such that 100% passed through a No. 16 U.S. Standard Screen, 45% was retained on a No. 20 U.S. Standard Screen, 45% was retained on a No. 30 U.S. Standard Screen, 10% passed the No. 30 screen and only 4% passed a No. 100 U.S. Standard Screen as fines.

This product was tested for brewing time. With hard water, the product had a brew time of 221 seconds. With softened water, the product had a brew time of 247 seconds. The pH of the brew prepared with softened water was approximately 5.2.

In tests of coffee brews prepared using softened water, a statistically significant number of testers usually constituting better than 85% of the test panel and often constituting 100% of the test panel picked the coffee brew prepared from the coffee composition prepared as described in this example as the preferred brew, for example, in a test using a panel of 16, at least 14 preferred the brew prepared from the coffee of this example.

EXAMPLE II

A blend of green coffee beans is prepared by mixing on a weight basis, 60% of Santos coffee, 30% Colombian coffee and 10% of African Robusta. 500 pounds of the blended green beans are roasted to a temperature of approximately 396° F. so that an optical density of a brew of a sample to the roasted beans was 0.38 by the spectrophotometer test.

The roasted beans were cooled to room temperature and the beans sprayed with one quart of solution containing one pound of citric acid so as to incorporate approximately 0.2% by weight of citric acid.

The citric acid impregnated coffee was ground to a particle size such that 2% is retained on a No. 16 U.S. Standard Screen, 32% is retained on a No. 20 U.S. Standard Screen, 46% is retained on a No. 30 U.S. Standard Screen, 20% passes the No. 30 U.S. Standard Screen and approximately 6% passes a No. 100 U.S. Standard Screen.

This product was tested for brewing time. With hard water, the product had a brew time of 238 seconds. With softened water, the product had a brew time of 251 seconds. The pH of the brew prepared with softened water was approximately 5.1.

The coffee compositions show to advantage irrespective of the brewing method, although some property such as color or taste may show greater enhancement than the other, but the advantages in all properties are particularly apparent when subjected to "drip-type" brewing or when using pressure in a closed system.

The foregoing description is given for clearness of understanding and no unnecessary limitation should be understood therefrom because modifications will be understood by those skilled in the art.

We claim:

1. The method of preparing a coffee adapted for use with softened water which comprises roasting green coffee beans to a temperature in the range between about 375° F. and 425° F. until the filtrate obtained by brewing 2 ounces of comminuted roasted beans of a particle size of 100% passing a 30 mesh standard screen to 100 cc. of boiling distilled water and boiling for five minutes, cooling the decoction to 68° F., diluting with distilled water to a volume of 100 ml., and filtering, when read on the spectrophotometer at a 500 millimicron wavelength, has an optical density between 0.35 and 0.45, and irrespective of order, the steps of incorporating an organic food acid in an amount between about 0.1% and about 0.5% by weight of the coffee and comminuting the roasted beans whereby a particulate material is recoverable of a particle size such that at least 95% passes through a No. 16 U.S. Standard Screen and the maximum amount of particles passing a No. 100 U.S. Standard Screen is less than about 6%.

2. The method according to claim 1 in which the organic food acid is citric acid.

3. The method according to claim 1 wherein the coffee beans are roasted to a temperature in the range between about 390° F. and 410° F.

4. The method according to claim 1 wherein the optical density is in the range between about 0.38 and about 0.42.

5. The method according to claim 1 wherein the organic food acid is added as a water solution and applied by spraying onto roasted coffee beans after the cooling thereof.

6. The method according to claim 1 wherein the organic food acid in pulverulent form is mixed with comminuted coffee beans.

References Cited

UNITED STATES PATENTS 1,946,398   2/1934   Gilbreath _____ 99—68

OTHER REFERENCES

Lockhart, Ernest E., "Water, Coffee, and Beverage Preparation," publ. by Coffee Brewing Inst., Inc. New York, publication No. 56, April 1966, pp. 4 and 9 relied on.

Vogel, Edward H., Jr., et al., "The Practical Brewer," publ. by Master Brewers Assoc. of America, St. Louis, 1964, p. 5.

MAURICE W. GREENSTEIN, *Primary Examiner.*

A. LOUIS MONACELL, *Examiner.*

UNITED STATES PATENT OFFICE
CERTIFICATE OF CORRECTION

Patent No. 3,373,041 March 12, 1968

Jack Bloom et al.

It is certified that error appears in the above identified patent and that said Letters Patent are hereby corrected as shown below:

Column 4, line 23, "ounces" should read -- grams --.

Signed and sealed this 29th day of July 1969.

(SEAL)
Attest:

Edward M. Fletcher, Jr.
Attesting Officer

WILLIAM E. SCHUYLER, JR.
Commissioner of Patents